United States Patent [19]

Tamura

[11] Patent Number: 5,158,584
[45] Date of Patent: Oct. 27, 1992

[54] OXYGEN ENRICHING MODULE AND OXYGEN ENRICHING APPARATUS USING SAME

[75] Inventor: Hiroki Tamura, Iwakuni, Japan

[73] Assignee: Teijin Limited, Osaka, Japan

[21] Appl. No.: 663,760

[22] Filed: Mar. 1, 1991

Related U.S. Application Data

[63] Continuation of Ser. No. 260,398, Oct. 20, 1988, abandoned.

[30] Foreign Application Priority Data

Oct. 23, 1987 [JP] Japan .................. 62-266586

[51] Int. Cl.$^5$ .......................................... B01D 53/22
[52] U.S. Cl. ..................... 55/158; 55/189; 55/471; 55/472
[58] Field of Search .............. 55/16, 68, 158, 189, 55/471, 467, 472

[56] References Cited

U.S. PATENT DOCUMENTS

| | | | |
|---|---|---|---|
| 3,369,343 | 2/1968 | Robb ........................... | 55/16 |
| 3,509,694 | 5/1970 | Imai ........................... | 55/16 |
| 3,930,813 | 1/1976 | Gessner ........................ | 55/16 |
| 3,930,814 | 1/1976 | Gessner ........................ | 55/16 |
| 3,976,451 | 8/1976 | Blackmer et al. ............... | 55/158 |
| 3,979,190 | 9/1976 | Hedman ........................ | 55/16 X |
| 4,174,955 | 11/1979 | Blackmer et al. .............. | 55/16 X |
| 4,214,020 | 7/1980 | Ward et al. .................. | 55/16 X |
| 4,341,005 | 7/1982 | Oscarsson ..................... | 55/158 X |
| 4,508,548 | 4/1985 | Manatt ........................ | 55/16 X |
| 4,537,606 | 8/1985 | Itoh et al. ................... | 55/158 |
| 4,553,988 | 11/1985 | Shimizu et al. ................ | 55/158 |
| 4,556,180 | 12/1985 | Manatt ........................ | 55/158 X |
| 4,632,677 | 12/1986 | Blackmer ...................... | 55/158 |
| 4,681,602 | 7/1987 | Glenn et al. .................. | 55/16 X |
| 4,759,780 | 7/1988 | Yamada et al. ................. | 55/158 |
| 4,789,388 | 12/1988 | Nishibata et al. .............. | 55/158 |

FOREIGN PATENT DOCUMENTS

| | | |
|---|---|---|
| 0024718A2 | 3/1981 | European Pat. Off. . |
| 0054941 | 6/1982 | European Pat. Off. . |
| 0108843 | 5/1984 | European Pat. Off. ........... 55/158 |
| 0185980 | 7/1986 | European Pat. Off. . |
| 0312910 | 4/1989 | European Pat. Off. ........... 55/158 |
| 3619146 | 1/1988 | Fed. Rep. of Germany . |
| 36191462 | 1/1988 | Fed. Rep. of Germany . |
| 7517256 | 1/1976 | France . |
| 59-82532 | 6/1984 | Japan . |
| 59-082532 | 6/1984 | Japan . |
| 59-115727 | 7/1984 | Japan . |
| 60-014923 | 1/1985 | Japan ........................... 55/158 |
| 60-137806 | 7/1985 | Japan ........................... 55/16 |

(List continued on next page.)

OTHER PUBLICATIONS

Patent Abstracts of Japan, vol. 12, No. 301, Aug. 16, 1988.
Patent Abstracts of Japan, vol. 9, No. 125, May 30, 1985.

Primary Examiner—Robert Spitzer
Attorney, Agent, or Firm—Kenyon & Kenyon

[57] ABSTRACT

An oxygen enriching module provided with a bundle of many hollow oxygen enriching fibers, each having an air through-passageway enclosed by an oxygen selective permeable membrane wall, a container cell in the shape of a hollow open-ended casing for sealingly encasing the hollow oxygen enriching fibers, an axial air blowing device or air blowing fan integrally connected to at least one end of the container cell to cause an axial flow of the atmospheric air parallel with the axes of the bundle of many hollow oxygen enriching fibers and passing through the air passageways of the bundle of the many hollow oxygen enriching fibers, to thereby obtain an oxygen enriched air from the atmospheric air due to permeation of a part of the atmospheric air through the oxygen selective permeable membrane walls of the hollow oxygen enriching fibers into the chamber of the container cell. A portable oxygen enriching apparatus accommodating the oxygen enriching module provided with a bundle of many hollow oxygen enriching fibers is also disclosed.

11 Claims, 3 Drawing Sheets

FOREIGN PATENT DOCUMENTS

| | | | |
|---|---|---|---|
| 60-190202 | 9/1985 | Japan. | |
| 60-195002 | 10/1985 | Japan | 55/158 |
| 60-264309 | 12/1985 | Japan | 55/158 |
| 61-086923 | 5/1986 | Japan | 55/158 |
| 61-101225 | 5/1986 | Japan | 55/158 |
| 61-281003 | 12/1986 | Japan | 55/158 |
| 62-083304 | 4/1987 | Japan | 55/158 |
| 62-125823 | 6/1987 | Japan | 55/158 |
| 63-169923 | 7/1987 | Japan | 55/16 |
| 63-008204 | 1/1988 | Japan | 55/158 |
| 63-107802 | 5/1988 | Japan | 55/16 |
| 63-139003 | 6/1988 | Japan | 55/158 |
| 63-239101 | 10/1988 | Japan | 55/158 |
| 63-248418 | 10/1988 | Japan | 55/16 |
| 2122103A | 1/1984 | United Kingdom. | |
| 2122103 | 1/1984 | United Kingdom. | |

OXYGEN ENRICHING MODULE AND OXYGEN ENRICHING APPARATUS USING SAME

This application is a continuation of application Ser. No. 07/260,398, filed Oct. 20, 1988, now abandoned.

BACKGROUND OF THE INVENTION

1. Field of the Invention

The present invention relates to an oxygen enriching module utilizing a plurality of hollow-fibrous membranes permitting a selective permeation of oxygen over nitrogen, and an oxygen enriching apparatus accommodating the oxygen enriching module therein. More particularly, the present invention relates to a compact and light-weight oxygen enriching module and a compact and light-weight oxygen enriching apparatus utilizing the oxygen enriching module.

2. Description of the Related Art

A method of slightly increasing the concentration of oxygen in the air in a house, compared with the atmospheric air, is conventionally applied to obtain a comfortable living environment.

Further, it is known to adopt oxygen inhalation for the treatment of patients suffering from respiratory ailments such as asthma, emphysema, and chronic bronchitis. The conventional oxygen inhalation treatment employs an oxygen enriched air obtained by using an oxygen gas either evaporated from a liquid oxygen obtained by the low temperature processing of air or supplied from conventional gas cylinders. When the enriched air is produced, the oxygen gas is conventionally mixed with and diluted by the atmospheric air, but this dilution of the oxygen gas by mixing it with the atmospheric air is complicated and requires a certain skill when handling the mixing and diluting devices. Therefore, a membrane separating method utilizing the difference in the speeds of permeation of oxygen and nitrogen gases through a membrane formed by using a high molecular weight compound has recently been developed and brought into practical use. Namely, an oxygen enriching apparatus utilizing the membranes permitting a selective permeation of oxygen over nitrogen (hereinafter referred to "oxygen selective permeable membrane") is often used in a medical treatment apparatus for patients suffering from respiratory ailments. Nevertheless, the conventional oxygen enriching apparatuses weigh in excess of ten kilograms, and therefore, it is difficult and tiring to carry these apparatus when using same in different locations.

UK patent application GB 2122103A and European patent application No. 0024718 disclose the employment of hollow-fibrous oxygen permeable membranes for constructing an apparatus for supplying an oxygen enriched gas wherein a plurality of hollow-fibrous oxygen permeable membranes are stationarily held in parallel with one another by a casing, and when air is supplied inside the oxygen permeable membranes through the end openings of the casing, an oxygen enriched air which has permeated through the walls of the hollow-fibrous membranes is obtained from an outlet or outlets of the casing.

The above-mentioned UK and European patent applications are, however, silent about the design and manufacture of a compact and light weight oxygen enriching apparatus.

SUMMARY OF THE INVENTION

Therefore, an object of the present invention is to provide a small size light weight oxygen enriching module.

Another object of the present invention is to provide a portable assembled oxygen enriching apparatus capable of being easily carried and used at different locations, such as the home, in a car, and outdoors.

A further object of the present invention is to provide a durable and inexpensive oxygen enriching apparatus having a simple construction.

In accordance with the present invention, there is provided an oxygen enriching module for generating an oxygen enriched air from the atmospheric air, which comprises:

a plurality of hollow oxygen enriching fibers formed as a bundle of hollow oxygen enriching fibers and extending in parallel with one another, each hollow oxygen enriching fiber having openings at opposite ends thereof and an air passageway enclosed by a cylindrical wall having an oxygen selective permeation property;

a container cell in the shape of an open-ended hollow casing and having a chamber for containing the bundle of hollow oxygen enriching fibers therein;

means for securing both end portions of the bundle of hollow oxygen enriching fibers to inner wall portions of the hollow casing adjacent to respective open ends thereof in such a manner that the respective openings of each hollow fiber are kept open and a fibrous portion axially extending between both end portions of each hollow oxygen enriching fiber is sealingly confined within the chamber of the container cell;

an axial air flow generating unit integrally connected to at least one end of the container cell to generate an axial flow of the atmospheric air parallel with the axes of the hollow oxygen enriching fibers, which flow enters the air passageways of all of the bundle of hollow oxygen enriching fibers through one of the openings of respective hollow oxygen enriching fibers and is emitted from the air passageways through the other of the openings of respective hollow oxygen enriching fibers as an oxygen depleted air, to thereby obtain an oxygen enriched air permeating through the cylindrical wall of the hollow oxygen enriching fibers into the chamber of the container cell; and, outlet means arranged at a portion of the container cell, for obtaining the oxygen enriched air from the chamber of the container cell.

In accordance with the present invention, there is also provided a portable assembled oxygen enriching apparatus for producing an oxygen enriched gas from the atmospheric air, comprising:

a casing forming an outer shell of the apparatus and having an inlet opening for introducing the atmospheric air, an outlet opening for exhausting an oxygen depleted air, and a delivery port for delivering oxygen enriched air;

an oxygen enriching module which comprises: a plurality of hollow oxygen enriching fibers formed as a bundle of hollow oxygen enriching fibers extending in parallel with one another, each hollow oxygen enriching fiber provided with openings at opposite ends thereof and an air passageway enclosed by a cylindrical wall having an oxygen selective permeation property; a container cell in the shape of an open-ended hollow casing and having a chamber for containing the bundle of hollow oxygen enriching fibers therein; adhesive means for securing both end portions of the bundle of hollow oxygen enriching fibers to inner wall portions of the hollow casing adjacent to respective open ends thereof in such a manner that the respective openings of each hollow fiber are kept open and a fibrous portion axially extending between both end portions of each hollow oxygen enriching fiber is sealingly confined within the chamber of the container cell; an axial air flow generating means integrally connected to at least one end of the container cell to generate an axial flow of the atmospheric air parallel with the axes of the hollow oxygen enriching fibers, which flow enters the air passageways of all of the bundle of hollow oxygen enriching fibers through one of the openings of respective hollow oxygen enriching fibers and is emitted from the air passageways through the other of the openings of respective hollow oxygen enriching fibers as an oxygen depleted air, to thereby obtain an oxygen enriched air permeating through the cylindrical wall of the oxygen enriching fibers into the chamber of the container cell; and, outlet means arranged at a portion of the container cell, for obtaining the oxygen enriched air from the chamber of the container cell;

a vacuum pump unit provided with a suction port connected to the outlet means of the oxygen enriching module for pumping in the oxygen enriched air produced by the oxygen enriching module, and a discharge port for discharging the pumped oxygen enriched air; and, a delivery unit for delivering the oxygen enriched air pumped by the vacuum pump toward the delivery port of the casing.

BRIEF DESCRIPTION OF THE DRAWINGS

The present invention will become more apparent from the ensuing description of the preferred embodiments thereof with reference to the accompanying drawings wherein.

DESCRIPTION OF THE PREFERRED EMBODIMENTS

Figure 1:
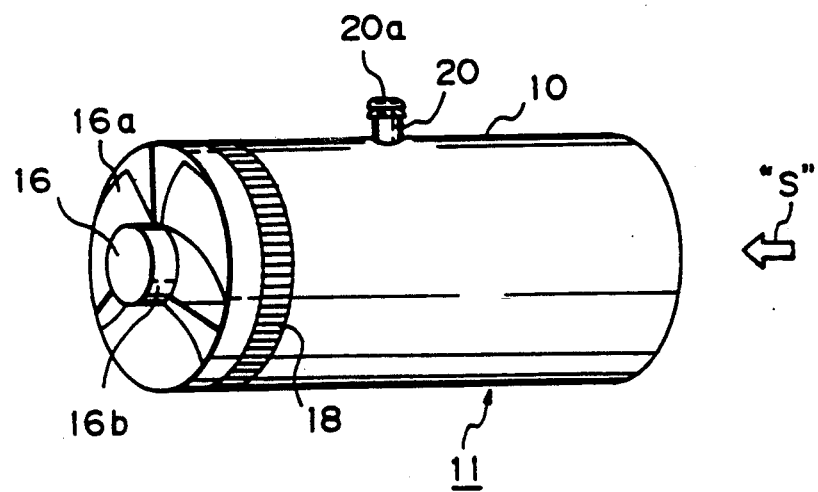
FIG. 1 is a perspective view of an oxygen enriching module according to an embodiment of the present invention.
Figure 2:
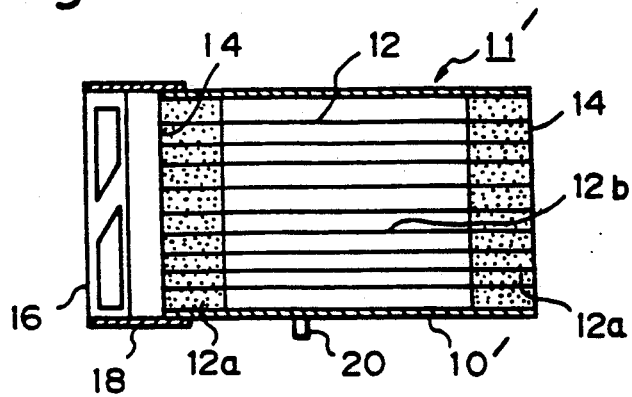
FIG. 2 is a longitudinal cross-sectional view of the module of FIG. 1.

Referring to FIGS. 1 and 2, an oxygen enriching module of the first embodiment has a container cell 10 in which a plurality of hollow oxygen enriching fibers 12 are encased as a bundle of open-ended, axially and fixedly extended fibers, each having an oxygen selective permeable thin film or membrane formed on an inner wall of the hollow fiber to enclose an air passageway to which the source air is supplied. Both ends 14 of the bundle of the hollow oxygen enriching fibers 12 are kept open. The container cell 10 has the shape of a hollow cylindrical casing member having one end to which an axial air fan 16 having a cylindrical form is integrally connected by an annular connector member, e.g., an annular rubber ring 18. The axial air fan 16 has blades 16a mounted to be driven by an electric motor, i.e., an electric DC motor 16b. The axial air fan 16 generates an axial flow of the source air (a flow of the atmospheric air) axially introduced into the air passageways of the oxygen enriching fibers 12 from the direction designated by an arrow "S" in FIG. 1 via an appropriate air filtering element 15. Namely, the suction side of the axial air fan 16 is connected to one end of the container cell 10. The bundle of the hollow oxygen enriching fibers 12 are rigidly secured at both end portions 12a thereof to inner surface portions of the container cell 10 by an appropriate adhesive, such as an epoxy resin adhesive, and therefore, the fibrous portions 12b of the fibers 12 extending between the end portions 12a are sealed within a chamber of the container cell 10. The fibrous portions 12b permit a permeation of oxygen over nitrogen in the source air passing through the air passageways, and as a result, the oxygen enriched air is emitted from the fibrous portions 12b of the hollow oxygen enriching fibers 12 into the chamber of the container cell. The container cell 10 is provided with a nipple device 20 having an air outlet 20a for obtaining the oxygen enriched air from the chamber of the container cell 10.

Figure 3:
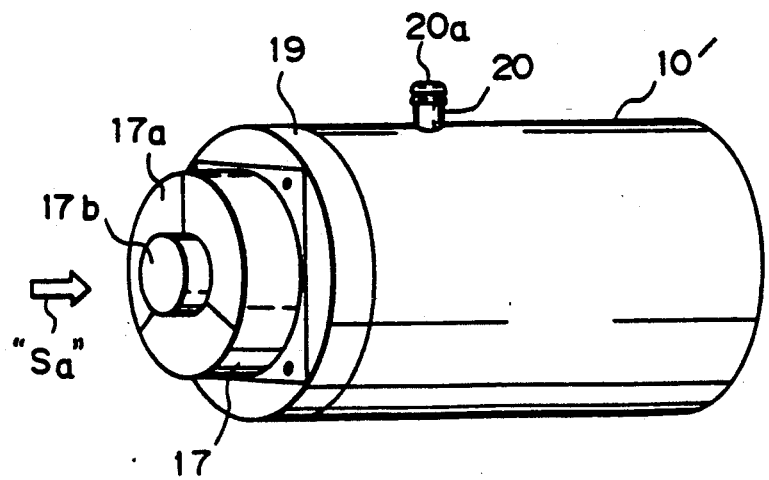
FIG. 3 is a similar perspective view of an oxygen enriching module according to another embodiment of the present invention.
Figure 4:
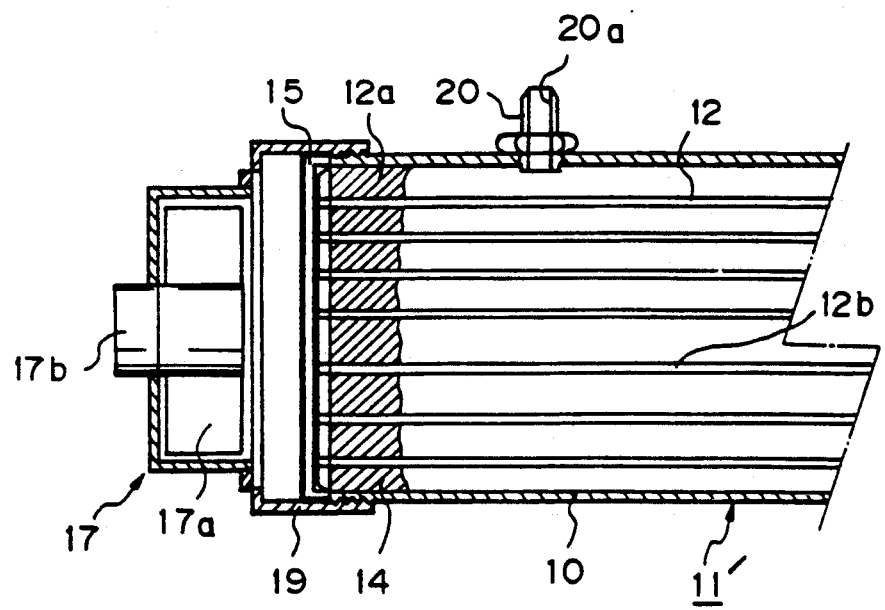
FIG. 4 is a partial cross-sectional view of the module of FIG. 3.

FIGS. 3 and 4 show another oxygen enriching module in which an axial air fan 17 is integrally connected to one end of the container cell 10' at the delivery side thereof, and thus a pressurized source air enters the hollow oxygen enriching fibers 12 from a direction designated by an arrow "Sa". Further, the fan 17 is connected to the container cell 10' by an internally threaded ring 19, and has blades 17a rotated by a central electric motor 17b. An appropriate air filtering element 15 is arranged in front of the air entrance end of the container cell 10' to filter the source air. The other portions of the module is substantially the same as the module of FIGS. 1 and 2.

Figure 5:
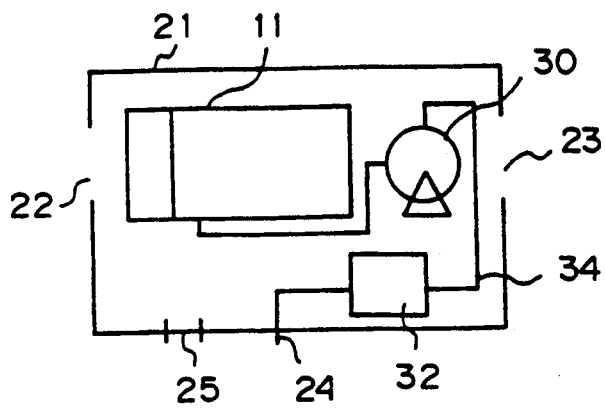
FIG. 5 is a schematic view of an oxygen enriching apparatus incorporating therein the oxygen enriching module as illustrated in FIG. 1 or 3, according to an embodiment of the present invention; and, FIG. 6 is a similar schematic view of an oxygen enriching apparatus according to another embodiment of the present invention.

FIG. 5 illustrates an oxygen enriching apparatus incorporating therein the oxygen enriching module 11' of FIGS. 1 and 2 or FIGS. 3 and 4 respectively. The apparatus is provided with a casing 21 in which a vacuum pump 30, a cooling and water-separating means 32 for cooling the oxygen enriched air obtained from the module 11' and for separating water component from the oxygen enriched air, and a delivery conduit 34 are contained together with the oxygen enriching module 11'. The casing 21 is also provided with an air inlet opening 22 for introducing the source air, an air outlet opening 23 for exhausting the used air, i.e., the oxygen depleted air, a delivery port 24 for the oxygen enriched air. An electric connecter 25 is attached to the casing 21 to connect the apparatus to the outside electric power source.

Figure 6:
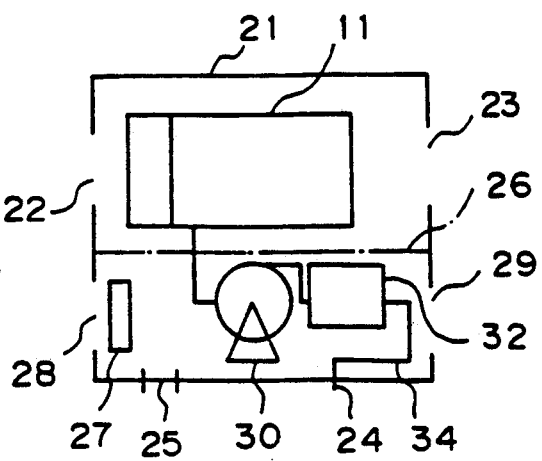

FIG. 6 illustrates another oxygen enriching apparatus which is different from that of FIG. 5 in that a partition plate 26 defining a separate chamber for removably mounting therein the oxygen enriching module 11' and a cooling fan 27 for cooling the vacuum pump 30 are arranged in the casing 21. Accordingly, the casing 21 is formed with an opening 28 for introducing the cooling air, and an opening 29 for exhausting the cooling air from inside the casing 21.

In practical operation of the apparatus, when the vacuum pump 30 applies a vacuum pressure to the outside of the hollow oxygen enriching fibers 12 via the delivery port 20 of the module 11', the oxygen enriched air permeating through the oxygen enriching fibers 12 is delivered to the delivery port 24 via the delivery conduit 34, and the cooling and water separating means 32.

Preferably, the oxygen enriching fiber is comprised of a fine porous support member in the shape of a hollow cylindrical fiber, and a membrane coating the inner wall face of the fine porous support member and permitting a selective permeation of oxygen over nitrogen.

The above-mentioned fine porous support member in the shape of a hollow cylindrical fiber may be a hollow fibrous support made by the conventional wet spinning method in which a polymer material, such as a polysulfone, a cellulose ester, a polyamide or the like is dissolved in a solvent, and the dissolved polymer is then extruded from an annular spinning nozzle into an appropriate solidifying liquid so that the extruded fibrous polymer is solidified in the liquid by the removal of the solvent.

The above-mentioned hollow fibrous support is then subjected to a process for forming the oxygen selective permeable membrane on the inner face of the hollow fibrous support. Namely, for example, a method is used in which a solvent such as a polydimethyl siloxane solution or a poly-4-methyl-1-pentene solution is poured into the through-hole of the hollow fibrous support to coat the inner wall face of the support. Another method as disclosed, for example, in Japanese Unexamined (Kokai) patent publication No. 60-19202, also may be used, in which a thin oxygen selective permeable film is formed by the reaction of a multifunctional monomer, and thus oxygen enriching hollow fibers, each having a substantial length of an open-ended fibrous portion provided with an air passageway therein enclosed by the oxygen selective permeable wall, are obtained.

A number of the above-mentioned oxygen enriching fibers are then bundled together and placed in a container cell having the shape of a hollow open-ended casing. Namely, a number of oxygen enriching fibers are encased in the container cell as a bundle of oxygen selective permeable fibers while the opposite openings of the respective oxygen selective permeable fibers are kept open. Subsequently, opposite end portions of the bundle of the oxygen selective permeable fibers are cemented to the inner face of the container cell by an appropriate adhesive, such as a synthetic resin adhesive, by a conventional centrifugal forming method, and as a result, the fibrous portions of the respective oxygen selective permeable fibers extending between the cemented end portions thereof are sealed within the container cell. At this stage, a part of the cemented end portions of the bundle of the oxygen enriching fibers are cut away so that the opposite ends of each oxygen enriching fiber are opened.

Preferably, the inner diameter of the hollow oxygen enriching fiber is between 0.3 mm to 2.0 mm, more preferably, between 0.5 mm to 1.5 mm.

When the atmospheric air, i.e., a source air, is supplied into the air passageway of each hollow oxygen enriching fiber from one end of the openings thereof, the source air flows in the air passageway and is exhausted from the other of the openings, and a part of the source air is taken out of the fiber as an oxygen enriched air by passage through the oxygen selective permeable wall of the fiber. Therefore, the air exhausted from the other of the openings of the hollow oxygen enriching fiber is an oxygen diluted air with an oxygen concentration lower than that of the source air, i.e., the oxygen concentration of the atmospheric air, supplied at the first opening of the fiber.

On the other hand, since the oxygen depletion of the source air gradually progresses during the flow of the source air in the passageway from one end to the opposite end of the oxygen enriching fiber, the oxygen concentration of the oxygen enriched air obtained from the oxygen selective permeable wall of the oxygen enriching fiber at a portion adjacent to the other end (the outlet side) of the fiber, normally becomes less than that of the oxygen enriched gas obtained from the oxygen selective permeable wall of the fiber at a portion adjacent to the one end (the inlet side) of the oxygen enriching fiber. Accordingly, the supply of a sufficient amount of the source air to each hollow oxygen enriching fiber of the bundle of the fibers encased in the container cell is needed, to minimize a difference in the oxygen concentration of the oxygen enriched air obtained from various portions of the oxygen selective permeable wall of each fiber. To this end, the amount of source air supplied is usually several times to more than ten times the entire amount of the obtained oxygen enriched air with respect to each hollow oxygen enriching fiber.

If the inner diameter of each hollow oxygen enriching fiber is less than 0.3 mm, a large pressure loss of the source air flowing in the air passageways of the respective hollow oxygen enriching fibers will occur, and accordingly, the hollow oxygen enriching fibers are not supplied with a sufficient amount of the source air.

Conversely, if the inner diameter of each of the hollow oxygen enriching fibers is larger than 2 mm, the fiber may be deformed due to a pressure difference between the inside and outside of the fiber. Also, a surface area of the oxygen selective permeable membrane per unit volume of the oxygen enriching unit containing the bundle of oxygen enriching fibers therein will be reduced, which is not preferred.

With regard to the length of the hollow oxygen enriching fiber, if the fiber is long and has a small inner diameter, a pressure loss of the supplied source air becomes large, and thus an air blower or fan unit exhibiting a large static pressure is needed to compensate this pressure loss of the source air, and as a result, the air blower or fan unit becomes large and the electric power consumption is increased. Further, when the oxygen enriching unit with a large air blower or fan unit is accommodated in an oxygen enriching apparatus, an undesirable temperature rise will occur in the apparatus.

To avoid this problem while increasing a surface area of the oxygen selective permeable membrane per unit volume of the oxygen enriching module, the length (L mm) and inner diameter (d mm) of each hollow oxygen enriching fiber must satisfy the following condition. Namely, the value of $L/d^3$ must be less than 1,000 and preferably less than 800. If the above condition is satisfied, it is possible to prevent a large decrease in the oxygen concentration in the source air which is discharged from the end of each hollow oxygen enriching fiber without employing a large air blower or fan exhibiting a high static pressure, and as a result, it is possible to obtain an oxygen enriched air having a large oxygen concentration from every part of the bundle of hollow oxygen enriching fibers contained in the container cell of the oxygen enriching module. The number of hollow oxygen enriching fibers forming the bundle of fibers contained in the container cell is determined in compliance with the amount of the oxygen enriched air required and the operating condition of the oxygen enriching apparatus having an oxygen enriching module therein. Also, to make it easy to manufacture an oxygen enriching module and assemble same in an oxygen enriching apparatus, an appropriate number of oxygen enriching fibers are used to construct a single oxygen enriching module, and a plurality of such modules are assembled into one oxygen enriching apparatus. The present inventor conducted tests to determine the length and the inner diameter of the hollow oxygen enriching fiber to be incorporated into an oxygen enriching module according to the present invention, as follows.

First, an appropriate number of three different kinds of hollow oxygen enriching fibers, i.e., 200 mm long and 0.5 mm in inner diameter, 200 mm long and 0.6 mm in inner diameter, and 200 mm long and 0.7 mm in inner diameter, were prepared to manufacture three different oxygen enriching modules. Then, an oxygen selective permeable film or membrane having a coefficient of oxygen permeation of $1.2 \times 10^{-4}$ (cc(stp)/cm$^2$.sec.cmHg) and a 3.9 O$_2$/N$_2$ separation factor was formed in the above-mentioned three different hollow oxygen enriching fibers according to the method disclosed in Japanese Unexamined (Kokai) patent publication No. 60-190202.

An axial blower or fan exhibiting a 10 mmAq static pressure was operated at a 160 torr operating pressure to supply these oxygen enriching modules with the atmospheric air (the source air). The oxygen concentration of the oxygen enriched air obtained by these modules, together with the value of L/d$^3$, are shown in Table 1, below.

TABLE 1

| Inner dia. d of Fiber (mm) | Length (L) of Fiber (mm) | L/d$^3$ | Oxygen concentration (%) |
|---|---|---|---|
| 0.5 | 200 | 1,600 | 38.9 |
| 0.6 | 200 | 926 | 39.9 |
| 0.7 | 200 | 583 | 40.4 |

The other test was conducted under the same test condition except that the fiber length was 150 mm. The test results are shown in Table 2.

TABLE 2

| Inner dia. d of Fiber (mm) | Length (L) of Fiber (mm) | L/d$^3$ | Oxygen concentration (%) |
|---|---|---|---|
| 0.5 | 150 | 1,200 | 39.8 |
| 0.6 | 150 | 694 | 40.6 |
| 0.7 | 150 | 437 | 40.9 |

From the test results shown in Table 1 and 2, it is understood that, when the value L/d$^3$ is larger than 1,000, the oxygen concentration of the oxygen enriched air obtained by the oxygen enriching modules becomes approximately less than 40%, due to the pressure loss of the source air as stated before. Therefore, the length L and the inner diameter d of the hollow oxygen enriching fiber should be determined to satisfy the condition that L/d$^3$ is less than 1,000, preferably less than 800. When a compact oxygen enriching module used for producing a portable oxygen enriching apparatus is manufactured, the length L of the hollow oxygen enriching fiber preferably is not longer than 400 mm. Nevertheless, if the length of the fiber is reduced, an effective length of the fiber to be used for enriching oxygen component in the air will become shorter, because both end portions of the fiber are used for securing the fiber to the container cell, and therefore, a length should preferably be 100 to 300 mm, taking the performance of the air blower unit into consideration. Further, the inner diameter d of the fiber is preferably 0.6 to 0.8 mm to prevent the afore-mentioned deformation of the fiber during the operation of the oxygen enriching module.

The shape of the cross section of the container cell for sealingly encasing the bundle of the above-mentioned hollow oxygen enriching fibers is not limited, and may be a circle, an ellipse or oval, or a rectangle. Nevertheless, the circular cross section is best from the view point of an easy manufacture of the container cell by the method of either forming a metallic plate or molding a plastic material, and of an easy connection of the container cell and the axial air blower or fan unit.

In the present invention, either an axial air blower or an axial fan is preferably used for supplying a source air, i.e., a flow of the atmospheric air, to one end of the oxygen enriching module, from the view point of realizing a small, compact, and light weight oxygen enriching apparatus. More preferably, the axial air fan is practically used because a sufficient supply of the source air can be obtained by a fan smaller than a blower without causing a pressure loss in the air passageways of the bundle of the hollow oxygen enriching fibers. In the conventional oxygen enriching apparatus, a sirocco fan is preferably used but, in the sirocco fan, an air inlet and an air outlet are arranged orthoganal to one another, and therefore, the entire size of the fan often becomes large. Thus, the Sirocco fan is not preferable for constructing a compact and small oxygen enriching module and apparatus.

The axial blower or fan also can be rotated at a high speed, and especially, the axial air fan can be smaller compared with the axial blower having a similar air supply performance. Further, since the axial fan can produce a flow of a source air flowing in a direction in register with the axis of the fan per se, the fan may be a cylindrical shape that is easiest to integrally connect to the container cell of the oxygen enriching module, and as a result, the assembly of the axial air fan and the container cell, i.e., the oxygen enriching module, can be as small and light as possible. A readily available axial air fan can supply a flow of air at 10 mmAq pressure. When this type of axial air fan is employed, if a ratio of the amount of the source air to the amount of the oxygen enriching air obtained from that source air is larger than 10, preferably larger than 15, the oxygen concentration of the oxygen enriched air can be 97% of the theoretical concentration calculated from O$_2$/N$_2$ selectivity of the oxygen selective permeable membrane, and accordingly, can be very high. Naturally, the length and inner diameter of the hollow oxygen enriching fibers are chosen to satisfy the condition that L/d$^3$ is less than 1,000.

The axial air fan or blower used also should be operated by a motor, preferably an electric DC motor driven by 12 DC volts, from the view point of manufacture of a portable oxygen enriching apparatus capable being either operated by wearing it on a human body or operated in, for example, a car compartment or a living room of a house by using commercially available dry cells or car batteries, but other motors, such as electric AC motors and an electric DC motors driven by DC volts other than 12 DC volts, may be used as required.

Also, if an electric converter is accommodated in or attached to a motor, the motor can be operated by an electric AC power of 100 volts or higher.

If an electric DC motor is employed for driving an axial air fan or blower, it is possible to easily control the speed of the motor, to thereby control the performance of the fan or blower.

Preferably, the above-mentioned axial air fan or blower for supplying the source air (the atmospheric air) to the hollow oxygen enriching fibers is integrally connected at a position adjacent to an end position of the container cell encasing the oxygen enriching fibers therein, so that the axial flow of the source air is directly supplied into all of the bundle of the hollow oxygen enriching fibers. The axial air fan or blower may be disposed so that a suction pressure is applied to one end of the container cell whereby the source air is introduced into the oxygen enriching fibers encased within the container cell from the other end of the container cell. On the other hand, the axial air fan or blower may be disposed so that a pressurized source air is directly supplied to the hollow oxygen enriching fibers within the container cell from one end of the container cell. Moreover, the axial fans or blowers are attached to both ends of the container cell of the oxygen enriching module as required. At this stage, the axial air fan or blower is integrally connected to the end or ends of the container cell in such a manner that a flow of the source air enters the air passageways of the respective hollow oxygen enriching fibers from a direction approximately in register with the axes of the fibers, to thereby prevent a pressure loss of the source air. Further, the integral connection between the axial air fan or blower and the container cell of the oxygen enriching module is such that an approximately entire amount of the source air supplied by the fan or blower is substantially equal to the amount of source air passing through the module without causing an air loss. The employment of a cylindrical container cell is preferable for accomplishing the above-mentioned integral connection of the fan or blower and the container cell.

Generally, when an oxygen enriching apparatus is operated, a suitable air filtering element is disposed to filter the source air before the supply of the air to the oxygen selective permeable membranes, to thereby prevent damage to or contamination of the membranes due to dust suspended in the source air. The filtering element may be arranged at an inlet of the oxygen enriching apparatus where a source air (the atmospheric air) is introduced into the apparatus.

Preferably, in the oxygen enriching module according to the present invention, an appropriate small filtering element is removably arranged between the axial air fan or blower unit and the container cell encasing the bundle of hollow oxygen enriching fibers therein, to thereby permit the source air to enter the oxygen enriching fibers after passing through the filtering element. The removable arrangement of the filtering element makes it possible to replace it with a fresh element as required. Also, if desired, filtering elements may be arranged at both an air inlet of the oxygen enriching apparatus and the air entrance of the oxygen enriching module, to completely remove dust in the source air.

When the filtering element is arranged between the axial air fan or blower unit and the container cell, the filtering element is preferably constructed in such a manner that a hollow cylindrical sleeve element snugly fittable to the cylindrical outer periphery at the end of the container cell, and a filtering cloth attached to the end of the hollow cylindrical sleeve element are prepared. Thus, the hollow cylindrical sleeve element with the filtering cloth can be removably fitted to the end of the container cell of the oxygen enriching module of the present invention.

The filtering element may be arranged at an inlet of the oxygen enriching apparatus where a source air (the atmospheric air) is introduced into the apparatus.

The vacuum pump incorporated in the oxygen enriching apparatus of the present invention is non-exclusively, but is preferably, a dry vacuum pump such as a diaphragm type vacuum pump and a rotary vane type vacuum pump, so that difficulty in the removal of an oil mist may be avoided. A wet vacuum pump may be employed as required. The vacuum pump may be driven by an electric either AC or DC motor, but as stated about the air fan or blower for supplying the source air, the application of the electric DC drive is more suitable for adjustably controlling the operation of the vacuum pump and for permitting a portable type oxygen enriching apparatus to be used in various places by the employment of dry cells or batteries available in the market.

In the oxygen enriching apparatus, a water vapor component permeates through the oxygen selective permeable membrane more readily than the oxygen and the nitrogen. Thus, when the oxygen enriched air is pumped out by the vacuum pump, the air is warmed and wetted to an approximately 100% relative humidity. Therefore, when the oxygen enriched air is thereafter cooled, waterdrops unfavorably appear. Accordingly, an arrangement of an air cooling means for cooling the oxygen enriched air to thereby condense excessive water component contained in the air, and an appropriate water separator to remove the condensed water, is usually necessary. Examples of the air cooling means and the water separator are disclosed in, for example, Japanese Unexamined (Kokai) patent publication No. 59-115727 and Japanese Unexamined (Kokai) Utility Model publication No. 59-82532.

Preferably, the outlet means of the oxygen enriching module is arranged on the outer periphery of the container cell at a position close to the end of the container cell where the source air is introduced. When the length of the module is relatively short, the outlet means may be arranged at any position on the outer periphery of the container cell, and more than one such outlet means may be provided as required.

The oxygen enriched air pumped by the vacuum pump and passing through the water separator is led by an appropriate delivery conduit while passing through a flow meter and an oxygen concentration meter, as required, toward the delivery port of the oxygen enriching apparatus, and is used for various purposes outside the apparatus. If needed, an appropriate bactericidal filtering element may be arranged in the delivery conduit.

As understood from the foregoing description, the oxygen enriching apparatus according to the present invention is provided with an oxygen enriching module having an integral source air supply fan or blower, a vacuum pump for pumping oxygen enriched air out of the module, a cooling means for cooling the oxygen enriched air, and a delivery conduit means including the water separator and the bactericidal filtering element, which are compactly assembled in an appropriate casing forming an outer shell of the apparatus.

Preferably, the casing of the oxygen enriching apparatus is provided with an inlet opening for introducing the atmospheric source air from outside into the oxygen enriching module, an outlet opening for exhausting therefrom the oxygen depleted air that remains after the oxygen enriched air is obtained from the source air, and the delivery port for taking out the oxygen enriched air. An appropriate nipple is attached to the delivery port of the casing for connecting thereto an outside extension piping.

Also, the casing of the oxygen enriching apparatus is preferably provided with an electric connector by which the apparatus is connected to an outside electric power source as required. The electric connector may be omitted when the apparatus is exclusively operated by batteries removably set in the casing.

During the operation of the oxygen enriching apparatus, the operation of the motor driven air fan or blower and vacuum pump tends to cause a temperature rise in the casing. Therefore, the fan or blower and vacuum pump preferably are disposed in positions at which they are exposed to and cooled by the air exhausted from the apparatus through the outlet opening. An appropriate cooling fan may by separately provided, to prevent the temperature rise of the apparatus. In that case, the casing of the apparatus may be additionally provided with a cooling air inlet and outlet, respectively. Naturally, if the design of the apparatus allows, the source air inlet opening and the oxygen depleted air outlet opening are commonly used as the cooling air inlet and outlet.

The above-mentioned electric connector is used for supplying electric power to the axial air fan or blower of the oxygen enriching module, the vacuum pump for deriving the oxygen enriched air, and the cooling fan, and suitable switches may be interposed between the connector and the respective fan and pump units as required. The switches may be attached to the individual drive motors, or a single switch may be arranged to simultaneously drive all drive motors. Most preferably, the switches are arranged so that the vacuum pump cannot be operated during a non-operation of the source air supply fan, i.e., the axial air fan or blower of the oxygen enriching module.

When the apparatus is designed to be driven by an electric DC power, if an appropriate AC to DC converter device is provided, the apparatus may be provided with separate DC and AC connecters to be connected to DC and AC power sources, respectively.

From the foregoing description of the embodiments of the present invention it will be understood that, in accordance with the present invention, a small and light oxygen enriching module and a portable oxygen enriching apparatus capable of being conveniently used at various indoor and outdoor places is obtained.

I claim:

1. An oxygen enriching module for generating an oxygen enriched air from atmosphere air comprising:
    a plurality of hollow oxygen enriching porous fibers formed as a bundle of fibers extending in parallel with one another, each hollow oxygen enriching fiber being provided with openings at opposite ends thereof and an air passageway enclosed by an inner cylindrical wall coated with an oxygen selective permeable membrane and when the length of each hollow oxygen enriching fiber is "L" mm and when an inner diameter of the air passageway thereof is "d" mm, a value of L is between 100 through 300, and a value of $L/d^3$ is equal to or less than 800;
    a container cell in the shape of an open-ended hollow casing and having a chamber for containing the bundle of hollow oxygen enriching fibers therein;
    means for securing both end portions of the bundle of hollow oxygen enriching fibers to inner wall portions of the hollow casing adjacent to respective open ends thereof in such a manner that the respective openings of each hollow fiber are kept open and a fibrous portion axially extending between both end portions of each hollow oxygen enriching fiber is sealingly confined within the chamber of the container cell;
    an axial air flow generating means having an outlet static pressure of about 10 mm Aq, integrally connected to an end of the container cell to generate an axial flow of the atmospheric air parallel with the axes of the hollow oxygen enriching fibers, which flow enters the air passageways of all of the bundle of hollow oxygen enriching fibers through one of the openings of respective hollow oxygen enriching fibers and is emitted from the air passageways through the other of the openings of respective hollow oxygen enriching fibers as an oxygen depleted air, to thereby obtain an oxygen enriched air permeating through the cylindrical wall of the hollow oxygen enriching fibers into the chamber of the container cell; and,
    outlet means arranged at a portion of the container cell, for obtaining the oxygen enriched air from the chamber of the container cell.

2. An oxygen enriching module for generating an oxygen enriched air from the atmospheric air according to claim 1, wherein said inner diameter "d" of the air passageway of said each hollow oxygen enriching fiber is between 0.3 mm through 2.0 mm.

3. An oxygen enriching module for generating an oxygen enriched air from the atmospheric air according to claim 1, wherein said axial air flow generating means accommodates an electric DC drive motor therein.

4. An oxygen enriching module for generating an oxygen enriched air from the atmospheric air according to claim 3, wherein said axial air flow generating means comprises an axial fan provided with fans mounted on a central shaft driven by said electric DC drive motor arranged at a center of said axial fan, said axial fan being connected to said one end of said container cell.

5. An oxygen enriching module for generating an oxygen enriched air from the atmospheric air according to claim 3, wherein said axial air flow generating means comprises an axial air blower provided with blades on a central shaft driven by said electric DC drive motor, said axial air blower being connected to said one end of said container cell.

6. An oxygen enriching module for generating an oxygen enriched air from the atmospheric air according to claim 1, wherein said container cell in the shape of an open-ended hollow casing is a cylindrical rigid casing.

7. A portable assembled oxygen enriching apparatus for producing an oxygen enriched gas from atmospheric comprising:
    a casing means forming an outer shell of the apparatus, and having an inlet opening for introducing the atmospheric air, an outlet opening for exhausting an oxygen depleted air, and a delivery port for delivering the oxygen enriched air;

an oxygen enriching module which comprises: a plurality of hollow oxygen enriching porous fibers formed as a bundle of fibers extending in parallel with one another, each hollow oxygen enriching fiber provided with openings at opposite ends thereof and an air passageway enclosed by an inner cylindrical wall coated with an oxygen selective permeable membrane;

a container cell in the shape of an open-ended hollow casing and having a chamber for containing the bundle of hollow oxygen enriching fibers therein;

adhesive means for securing both end portions of the bundle of hollow oxygen enriching fibers to inner wall portions of the hollow casing adjacent to respective open ends thereof in such a manner that the respective openings of each hollow fiber are kept open and a fibrous portion axially extending between both end portions of each hollow oxygen enriching fiber is sealingly confined within the chamber of the container cell;

an axial air flow generating means integrally connected to an end of the container cell to generate an axial flow of the atmospheric air at a static pressure of about 10 mm Aq parallel with the axes of the hollow oxygen enriching fibers which flow enters the air passageways of all of the bundle of hollow oxygen enriching fibers through one of the openings of respective hollow oxygen enriching fibers and is emitted from the air passageways through the other of the openings of respective hollow oxygen enriching fibers as an oxygen depleted air, to thereby obtain an oxygen enriched air permeating through the hollow oxygen enriching fibers into the chamber of the container cell, wherein when the length of each of the plurality of hollow oxygen enriching fibers of said oxygen enriching module is L mm, and when an inner diameter of the air passageway thereof is d mm, a value of L is between 100 through 300, and a value of $L/d^3$ is equal to or less than 800;

outlet means arranged at a portion of the container cell, for obtaining the oxygen enriched air from the chamber of the container cell:

a vacuum pump means provided with a suction port connected to the outlet means of the oxygen enriching module to pump in oxygen enriched air produced by the oxygen enriching module, and a discharge port for discharging the pumped oxygen enriched air; and, a delivery means for delivering the oxygen enriched air pumped by the vacuum pump toward the delivery port of the casing means.

8. A portable assembled oxygen enriching apparatus for producing an oxygen enriched gas from the atmospheric air according to claim 7, wherein said axial air flow generating means of said oxygen enriching module accommodates an electric DC drive motor therein, and wherein said vacuum pump means accommodates an electric DC motor.

9. A portable assembled oxygen enriching apparatus for producing an oxygen enriched gas from the atmospheric air according to claim 7, wherein said inner diameter "d" of the air passageway of said each hollow oxygen enriching fiber is between 0.3 mm through 2.0 mm.

10. A portable assembled oxygen enriching apparatus for producing an oxygen enriched gas from the atmospheric air according to claim 9, wherein said length of each of the plurality of hollow oxygen enriching fibers of said oxygen enriching module is less than 400 mm, and wherein said inner diameter "d" of the air passageway of said each hollow oxygen enriching fiber is between 0.6 mm through 0.8 mm.

11. A portable assembled oxygen enriching apparatus for producing an oxygen enriched gas from the atmospheric air according to claim 7, wherein a filtering means is arranged adjacent to said inlet opening of said casing means to filter fine dust from the atmospheric air.

* * * * *

UNITED STATES PATENT AND TRADEMARK OFFICE
CERTIFICATE OF CORRECTION

PATENT NO. : 5,158,584
DATED : October 27, 1992
INVENTOR(S) : Hiroki Tamura It is certified that error appears in the above-identified patent and that said Letters Patent is hereby corrected as shown below:

Column 8, line 29, change "sirocco" to --Sirocco--.

Column 8, line 30, change "sirocco" to --Sirocco--.

Column 8, line 62, change "capable" to --capable of--.

Column 8, line 67, change "and an" to --and--.

Column 12, line 62, change "atomspheric" to --atmospheric air--.

Column 12, line 63, change "atmospheric" to --atmospheric air--.
Column 4, line 40, change "is" to --are--.

Signed and Sealed this

Sixteenth Day of November, 1993

Attest:

BRUCE LEHMAN

*Attesting Officer*     *Commissioner of Patents and Trademarks*